(12) United States Patent
Schmieding et al.

(10) Patent No.: US 9,730,466 B1
(45) Date of Patent: Aug. 15, 2017

(54) FRUIT SLICER AND JUICER APPARATUS AND METHOD

(71) Applicants: Alexander R. Schmieding, San Antonio, TX (US); Cristain Montemayor, Laredo, TX (US)

(72) Inventors: Alexander R. Schmieding, San Antonio, TX (US); Cristain Montemayor, Laredo, TX (US)

( * ) Notice: Subject to any disclaimer, the term of this patent is extended or adjusted under 35 U.S.C. 154(b) by 0 days.

(21) Appl. No.: 14/467,236

(22) Filed: Aug. 25, 2014

Related U.S. Application Data

(60) Provisional application No. 61/869,939, filed on Aug. 26, 2013.

(51) Int. Cl.
*A47J 19/02* (2006.01)
*A23N 1/02* (2006.01)
*A23L 2/04* (2006.01)

(52) U.S. Cl.
CPC ............... *A23N 1/02* (2013.01); *A23L 2/04* (2013.01); *A23V 2002/00* (2013.01)

(58) Field of Classification Search
CPC .......... A47J 19/022; A47J 19/06; A47J 19/02; A47J 2043/04481; A47J 43/286; A47J 19/005; A47J 44/00; B30B 9/02; B30B 9/04; B30B 9/06; A23N 1/02; A23N 1/00; A23L 2/04
See application file for complete search history.

(56) References Cited

U.S. PATENT DOCUMENTS

| | | | | | |
|---|---|---|---|---|---|
| 581,526 | A | * | 4/1897 | Straube | A47J 19/022 100/213 |
| 587,860 | A | * | 8/1897 | Redmon | A47J 19/022 100/130 |
| 620,047 | A | * | 2/1899 | Neal | A47J 19/022 100/125 |
| 1,457,478 | A | * | 6/1923 | Williams | A47J 19/022 100/193 |
| 1,762,031 | A | * | 6/1930 | Roberts | A47J 19/022 100/125 |

\* cited by examiner

*Primary Examiner* — Jill Warden
*Assistant Examiner* — Hong T Yoo
(74) *Attorney, Agent, or Firm* — Rick B. Yeager

(57) ABSTRACT

A handheld device that permits slicing and juicing a fruit in two steps of slicing and juicing. The device includes a cradle portion, a squeezer portion, and a blade assembly all joined at a common hinge. A lemon or other unsliced fruit is placed in the device cradle portion, and in a first slicing step, the user grasps a blade handle to rotate a blade into the fruit. In the second juicing step, the user grasps a handle of the squeezer portion and rotates the squeezer portion into the fruit to squeeze juice from the fruit. A funnel is provided to collect the juice. It is not necessary to slice lemons or other fruit with a knife before juicing, or to touch sliced fruit.

5 Claims, 10 Drawing Sheets

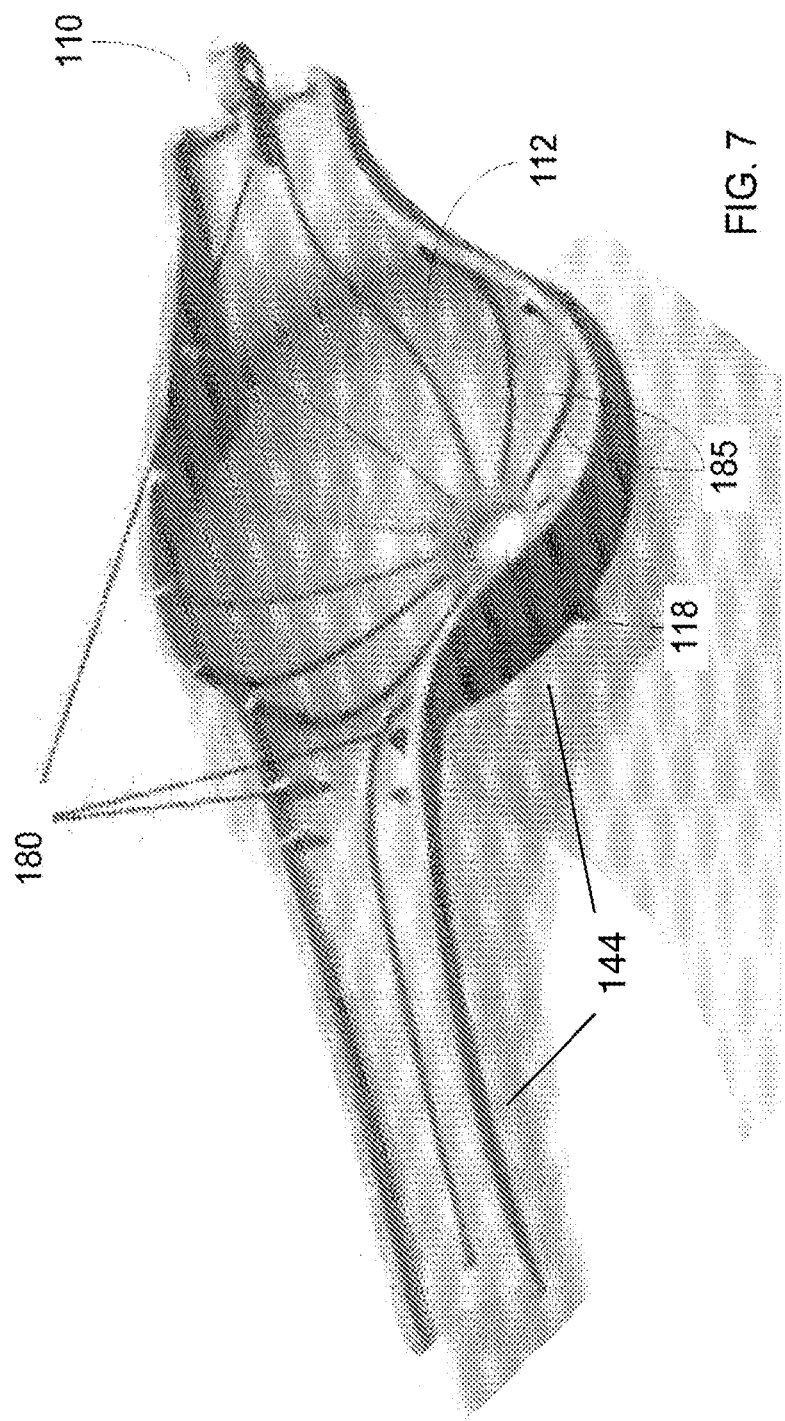

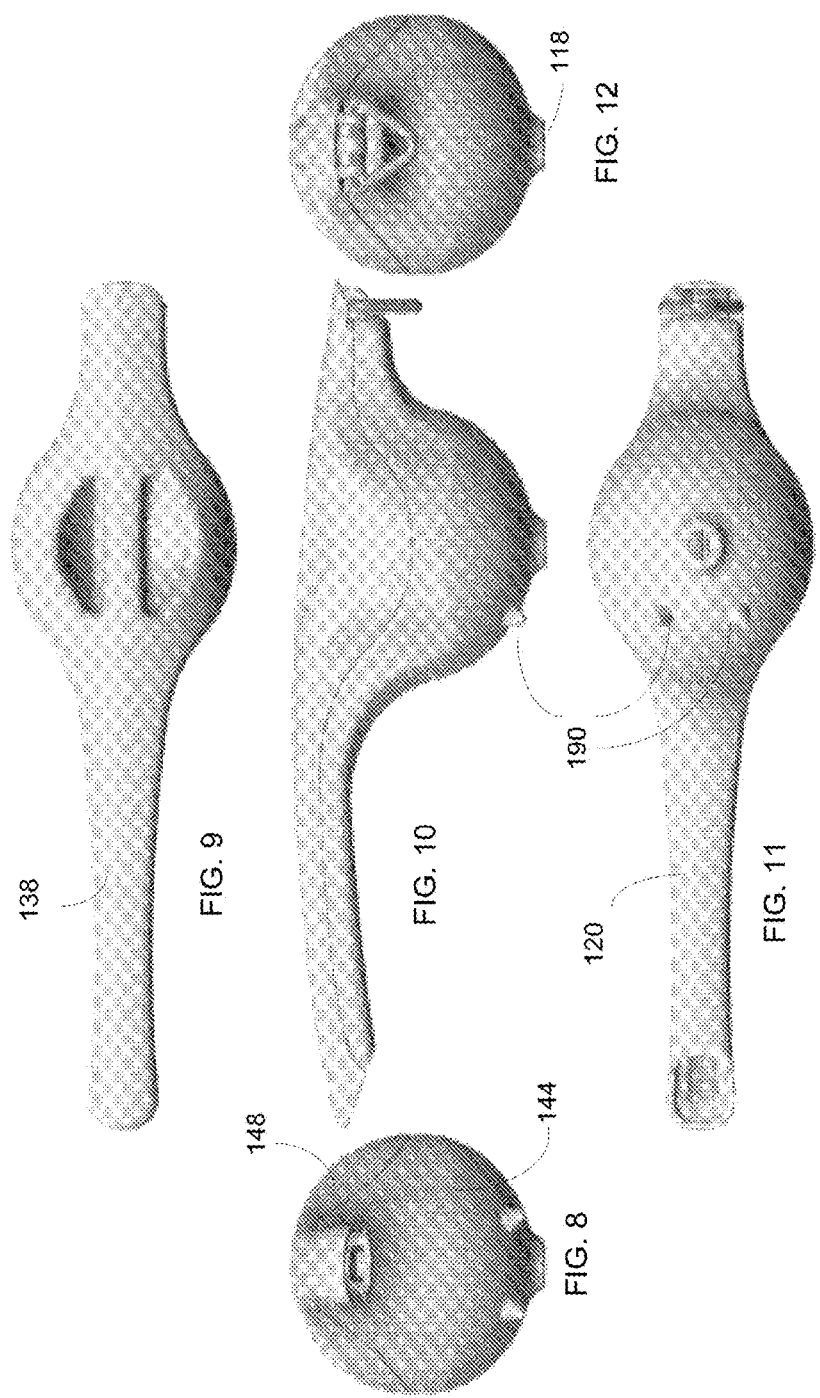

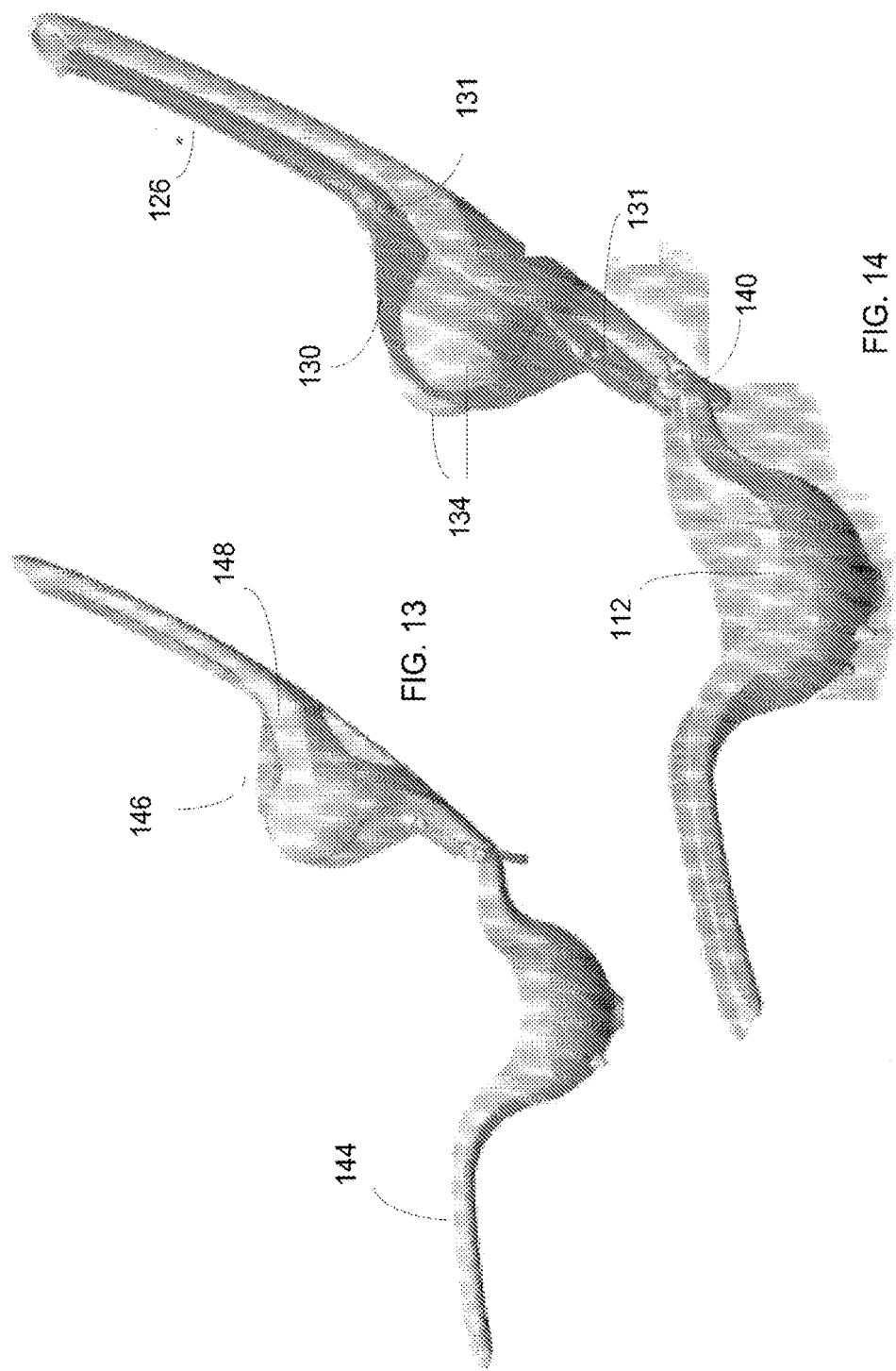

FRUIT SLICER AND JUICER APPARATUS AND METHOD

RELATED APPLICATIONS

This U.S. non-provisional patent application is related to U.S. Provisional Patent Application No. 61/869,939 filed by applicants on Aug. 26, 2013, and claims the benefit of that filing date.

BACKGROUND

Field of Invention

The current invention relates to an apparatus and method for juicing a fruit, and more specifically to slicing and juicing a fruit in a single device.

Prior Art

Prior art fruit juicers typically require that the fruit be cut in half, or in smaller pieces, before juicing.

In one embodiment of the current invention, a whole fruit, such as a lemon, is positioned in the juicer. A blade is provided in the juicer so that the fruit can be cut in a first operation, and then juiced in a second operation with the same device.

SUMMARY OF INVENTION

In one embodiment, the fruit slicer and juicer is a handheld device that permits slicing and juicing a fruit in two easy slicing and juicing steps. The device includes a cradle portion, a squeezer portion, and a blade assembly. The distal ends of the cradle portion, the squeezer portion, and the blade assembly are joined at a hinge, so that the squeezer portion, and the blade assembly may be rotated with respect to the cradle portion.

A lemon or other unsliced fruit is placed in a cradle in the device cradle portion. In a first slicing step, the user grasps a handle provided on the blade assembly and rotates the blade assembly about the hinge toward the cradle portion. As the blade portion rotates toward the cradle portion, a blade on the blade assembly slices the fruit.

In the second juicing step, the user grasps a handle of the squeezer portion and rotates the squeezer portion about the hinge toward the cradle portion. As the squeezer portion presses into the fruit, two spaced apart protrusions simultaneously squeeze the fruit on each side of the blade.

The combination of the slicing and juicing steps facilitates a quicker and safer juicing of lemons and other fruit. It is not necessary to slice lemons or other fruit with a knife before juicing, or to touch sliced fruit.

In one example, the device has a strainer to keep the fruit juice free of pulp and seed.

The device slices, juices, strains, and directs juice out of lemons and other fruit in two easy steps. The user does not expose skin to a knife blade, or expose clothes to acidic fruit juice.

Homeowners an use the device in their home kitchen. Restaurants, bars, and nightclubs can use the device for slicing and juicing lemons to marinate foods and to make mixed drinks in a quicker and safer manner.

The users of this fruit slicer and juicer will benefit with respect to convenience and safety. The users will find the device's two steps fast and easy and will appreciate the distance between the device's blade and the user's hands. Once the juice is being extracted from the lemon or other fruit, it will be strained and exerted onto the desired area. This process will eliminate pulp, seeds, and spurts of lemon or other fruit juice. This quick, safe, and easy process of slicing and juicing a lemon or other fruit will allow its users to do so with confidence.

BRIEF DESCRIPTION OF FIGURES

FIG. 7 is an top front perspective view of the of the cradle portion of the fruit slicer and juicer of FIG. 5.

FIG. 8 is an front view of the fruit slicer and juicer of FIG. 5.

FIG. 9 is an top view of the fruit slicer and juicer of FIG. 5.

FIG. 10 is a side view of the fruit slicer and juicer of FIG. 5.

FIG. 11 is a bottom view of the fruit slicer and juicer of FIG. 5.

FIG. 12 is a rear view of the fruit slicer and juicer of FIG. 5.

FIG. 13 is a side view of the fruit slicer and juicer of FIG. 5 in an open orientation.

FIG. 14 is a side perspective view of the fruit slicer and juicer of FIG. 5 in an open orientation.

DESCRIPTION OF EMBODIMENT

Fruit Slicer and Juicer Device

Figure 1:
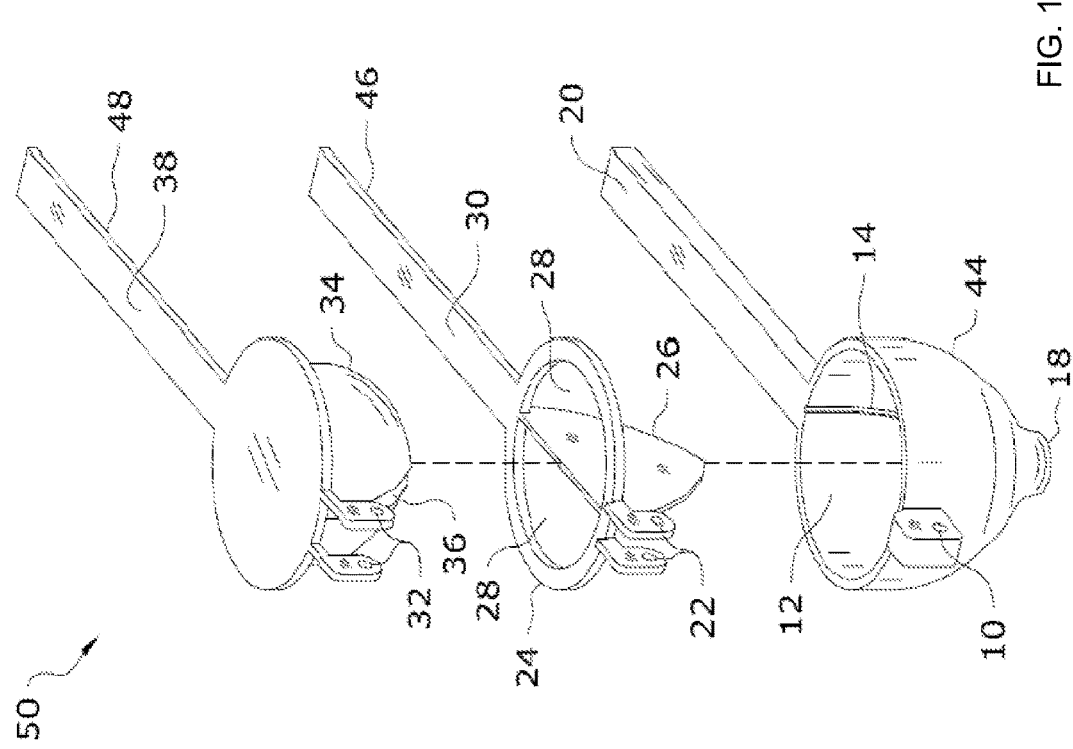
FIG. 1 is an exploded front perspective view of a first embodiment of a fruit slicer and juicer.

The following reference numbers are provided for convenience in reviewing the figures. FIGS. 1-4 show a first example device 50; and FIGS. 5-15 show a second example device 150.

First Example—Lemon Slicer and Juicer 50 blade assembly 46
  slicing handle 30
  blade ring 24
    juicer spaces 28
  blade 26
  slicer bolt rings 22
juicer portion 48
  juicing handle 38
  juicer protrusions 34
  blade space 36
  juicer bolt rings 32
cradle portion 44
  fruit whole-dome 12
  dome bolt rings 10
  blade indention 14
  seed/pulp strainer 16
  juice funnel 18
  dome handle 20
hinge bolt 40
hinge nut(s) 42

Second Example—Fruit Slicer and Juicer 150 blade assembly 146
    slicing handle 130
    blade attachment rivets 131
    blade 126
    slicer hinge rings 122
juicer portion 148
    juicing handle 138
    juicer protrusions 134
    blade space 136
    juicer hinge rings 132
cradle portion 144
    fruit whole-dome 112
    dome hinge rings 110
    juice funnel 118
    dome handle 120
    blade guides 180
    fruit support ribs 185
    legs 190
stop hinge 140
    clip 146

First Example Device

Figure 2:
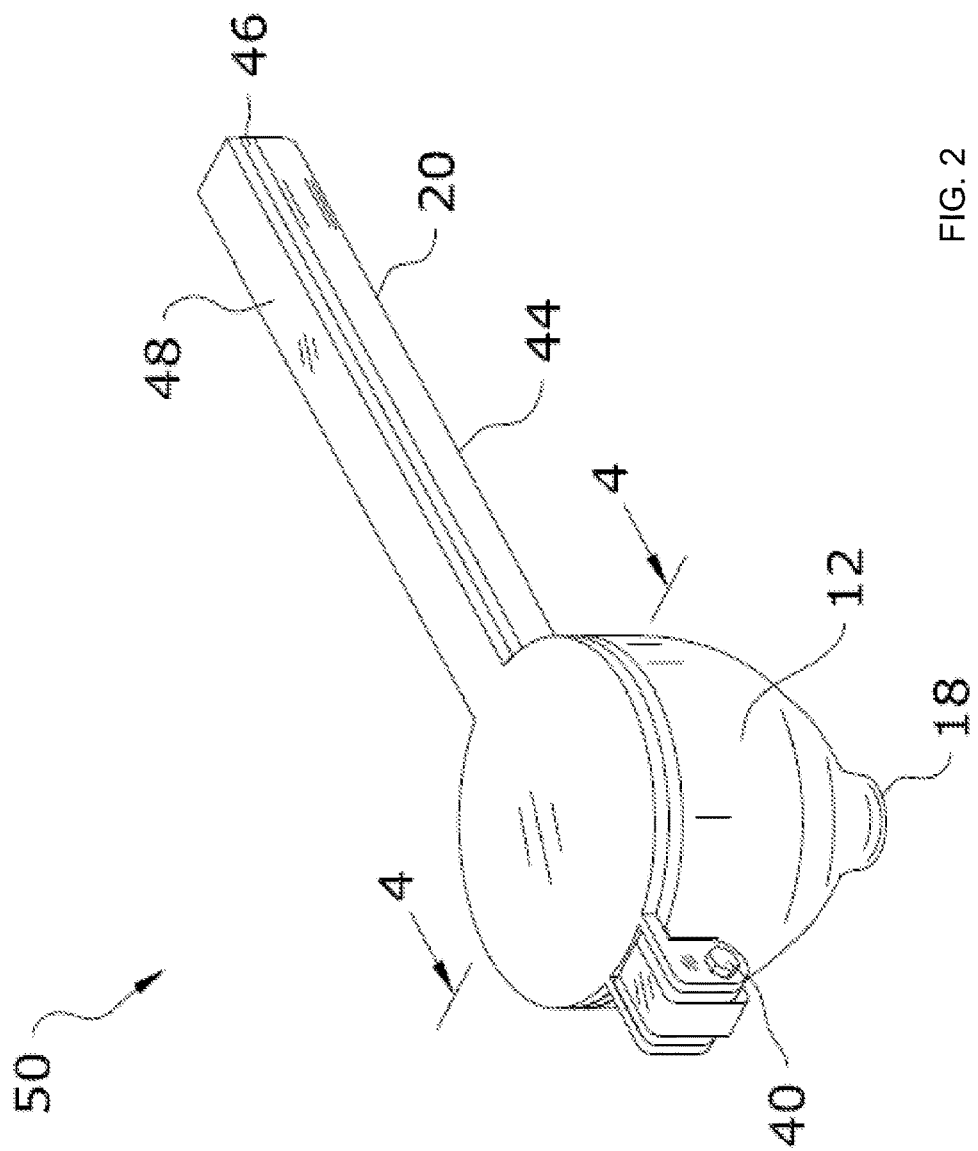
FIG. 2 is an top front perspective view of the fruit slicer and juicer of FIG. 1 in a closed orientation.
Figure 3:
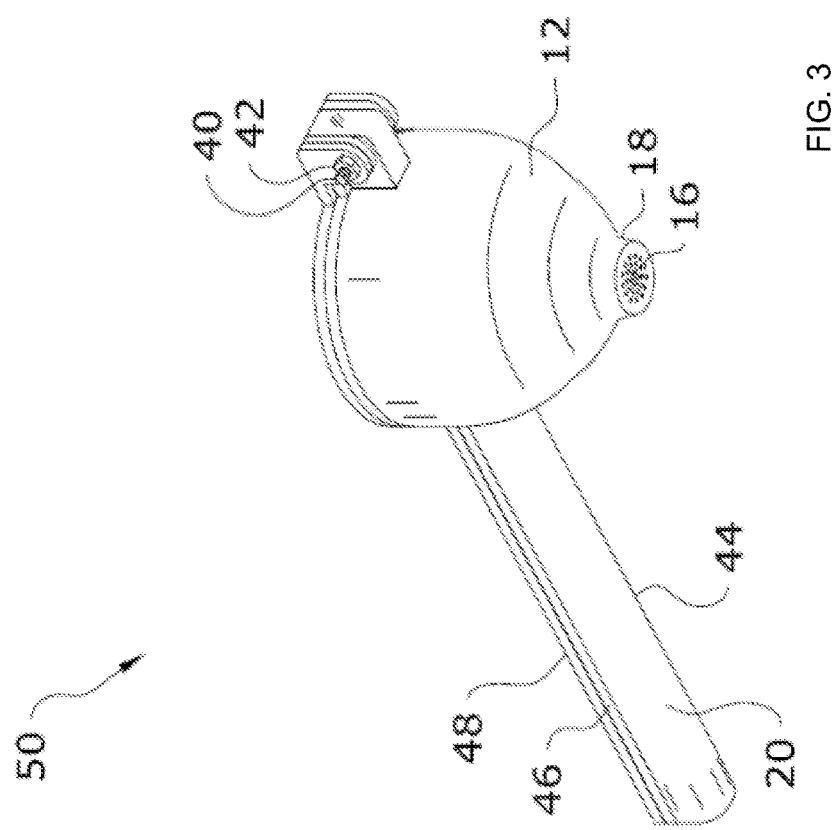
FIG. 3 is an bottom perspective view of the fruit slicer and juicer of FIG. 1 in a closed orientation.
Figure 4:
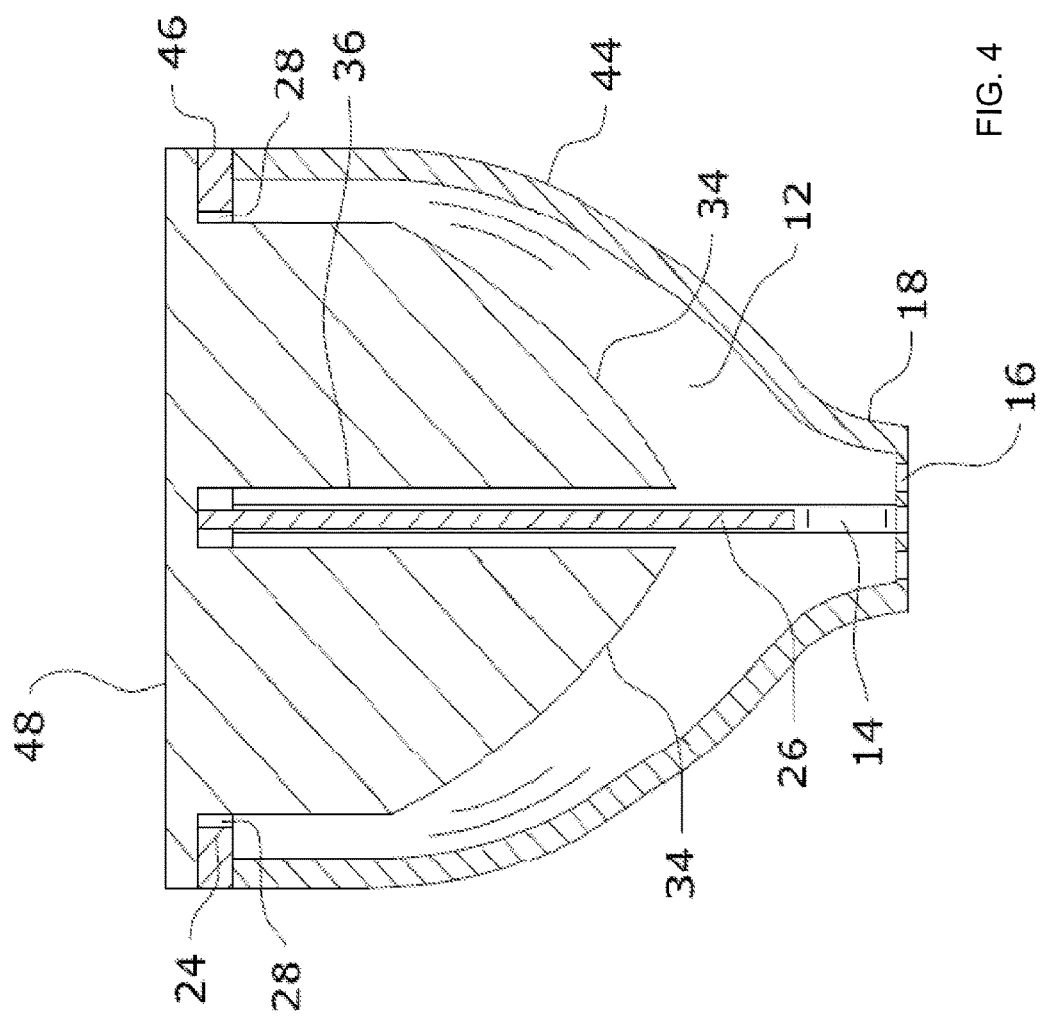
FIG. 4 is an front cross section view of the fruit slicer and juicer of FIG. 1 in a closed orientation.

FIG. 1 is an exploded front perspective view of a first embodiment of a fruit slicer and juicer 50. FIG. 2 is an top front perspective view of the fruit slicer and juicer of FIG. 1 in a closed orientation. FIG. 3 is an bottom perspective view of the fruit slicer and juicer of FIG. 1 in a closed orientation. FIG. 4 is an front cross section view of the fruit slicer and juicer of FIG. 1 in a closed orientation.

In this embodiment a lemon slicer and juicer 50 comprises a blade assembly 46, a juicer portion 48, and a cradle portion 44. Handles are provided on each of the blade assembly 46, a juicer portion 48, and a cradle portion 44, and the distal ends of each handle are pivotally connected with a hinge bolt 40.

The blade assembly 46 comprises a slicing handle 30, a blade ring 24, and slicer bolt rings 22. The blade ring 34 supports downwardly extending cutting blade 26. The blade ring 34 has juicer spaces 28 openings to permit juicer protrusions 34 to extend through the blade ring 24 and into fruit positioned in the fruit whole dome 12.

The juicer portion 48 comprises a juicing handle 38, two spaced apart juicer protrusions 34, and juicer bolt rings 32. A blade space 36 is provided between the two spaced apart juicer protrusions 34.

The cradle portion 44 comprises a fruit dome 12, a dome handle 20, and dome bolt rings 10. In this example, the fruit dome 12 comprises a blade indention 14, a seed and pulp strainer 16, and a juice funnel 18.

FIG. 4 shows the blade 36 positioned between the juicing protrusions 34 when the device is in a closed position. The blade indention 14 serves as additional space for the blade 26 during the slicing process. In this example, the blade 26 is connected or integral to connected to the center of the blade ring 24. The blade ring 24 is attached to the Slicing Handle 30 and serves as a reinforcement to hold the blade 26 in place. Empty spaces are provided in the blade ring 24 on each side of the blade 26, and serve as juicer spaces 28 to allow the juicers protrusions 34 to pass down on both sides of the blade 26 during the juicing step. These spaces permit the juicers protrusions 34 to squeeze the fruit without the blade 26 interfering with the movement of the juicers protrusions 34.

The juice funnel 18 typically directs juice flow into a container as the juice portion is pushed into the lemon or other fruit. In this example, the seed/pulp Strainer 16 at the bottom of the fruit whole-dome 12 captures seeds or pulp as the juice enters the juice funnel 18. The juice funnel 18 completely surrounds the seed/pulp strainer 16 in order to direct juice flow while avoiding spontaneous juice spurts.

In this example, a hinge bolt 40 and nut(s) 42 are provided to pivotally secure the slicer bolt rings 22, the juicer bolt rings 32, and the dome bolt rings, so that the slicing handle 30 and the juicing handle 38 may be independently rotated toward the dome handle 20. When all three handles are squeezed together they fit like a puzzle. In this example, there are two hinge nuts 42, one on each side of the hinge bolt 40 which will serve as reinforcements to keep the bolt and handles in place. The hinge bolt 40 will serve as a rotating axle that will enable movement for the handles. Two bolt rings are provided on the distal end of each handle, with a hole through the center of each ring. When all three handles are stacked on top of one another, all six holes will be aligned in order to pass the hinge bolt 40 through all six holes. In this example, the bolt rings are the largest on the dome handle 20 (bottom), slightly smaller on the slicing handle 30 (middle), and smallest on the juicing handle 38 (top). This sizing will allow all of the hinge rings to align and all six holes to become parallel. Once all six of the ring holes are parallel, a single hinge bolt will be passed though them and a nut will be placed on each side of the screw in order to hold all three handles and the screw in place.

In this example, an entire lemon is placed inside the fruit dome. In a first step, the blade handle is brought down and squeezed, and this action slices the fruit. In a second step, the juicer handle is then squeezed down; and this action juices the fruit. In various examples, the dome receptacle may be sized for fruit such as lemons, oranges and grapefruit. When squeezed down, the juicer protrusions 34 will squeeze a lemon, or other fruit, that is placed in the whole-dome 12 on the dome handle.

Example Operation

At step 1000, place a whole uncut lemon or other fruit into the whole-dome area 12 on the bottom dome handle 20.

At step 2000, grab the slicing handle 30 and squeeze it downward into the bottom dome handle 20. This will force the blade 26 down through the center of the lemon, slicing it in half.

At step 2000, grab the top juicing handle 38 and squeeze downward. This will force the juicer protrusions 34 past both sides of the blade 26, and down into the whole-dome area 12, thereby juicing the lemon.

As the lemon halves are being squeezed, the juice will travel down through the seed/pulp strainer 16 and out of the juice funnel 18 into a container (not shown).

The lemon slicer and juicer 50 is similar to a typical lemon squeezer, with additional features that make the lemon slicing and juicing process convenient and safe. The device allows you to both slice and juice a lemon in two easy steps with one device.

Alternatives

The material that will be used to make the handles of this device may include but is not limited to steel or other metal, or plastic. The material that will be used to make the blade of this device may include but is not limited to stainless steel, metal, plastic, or ceramic. The materials that will be used to assemble the device may include but is not limited to steel, metal, copper, or plastic.

This device color schemes, shapes, materials, designs, dimensions, mechanics, etc., may be altered or changed based on the manufacturing process, the manufacturing cost, and based on the device's use.

The device's artistic design may be altered or changed at any time depending on advertising and marketing purposes. Although the concept will remain persistently similar, it's dimensions, materials, design, and assembly may be altered or changed due to product expansion and improvement.

The shape and material used to make the device's blade may be altered or changed at any time depending on the most efficient, convenient, or safest way to slice the fruit.

The device's funnel designed to more properly direct juice flow could be manufactured as attached to the bottom dome handle or unattached. If the funnel is manufactured as unattached, the device may be slightly altered to allow the funnel to be a separate component that may be screwed on and off. Also, the funnel is an optional component that may or may not be used on the device at all depending on the manufacturing cost and process.

The proportions and measurements used to manufacture, design, assemble, or make the device can be altered or changed depending on the most efficient way to operate the device, and depending on the most efficient way to slice and juice various fruits.

This device may be altered or changed in order to apply its concept to a broader market, making it compatible for other vegetables, fruits, or foods.

Second Example—Fruit Slicer and Juicer 150

Figure 5:
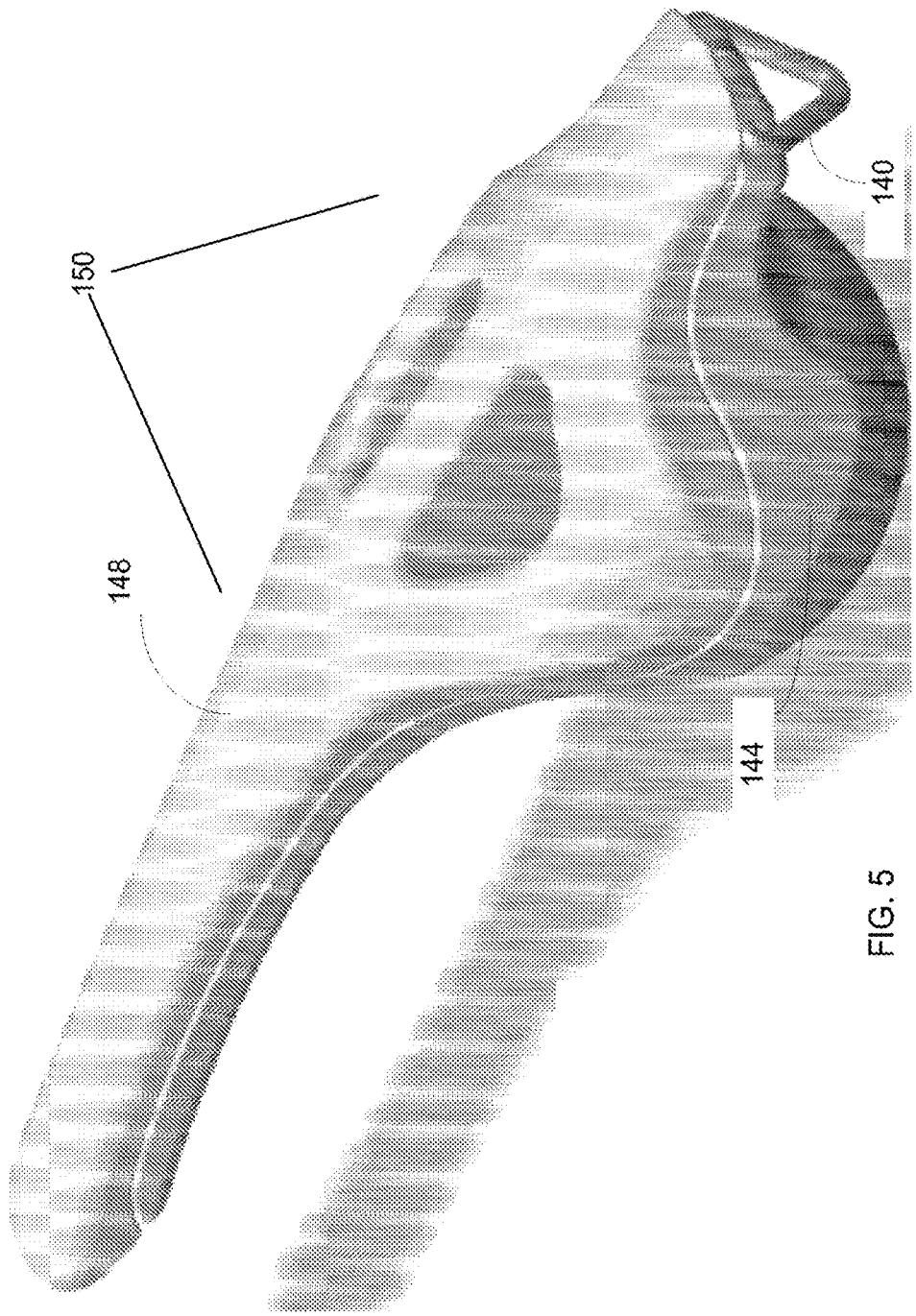
FIG. 5 is a top perspective view of a second embodiment of a fruit slicer and juicer in a closed orientation.
Figure 6:
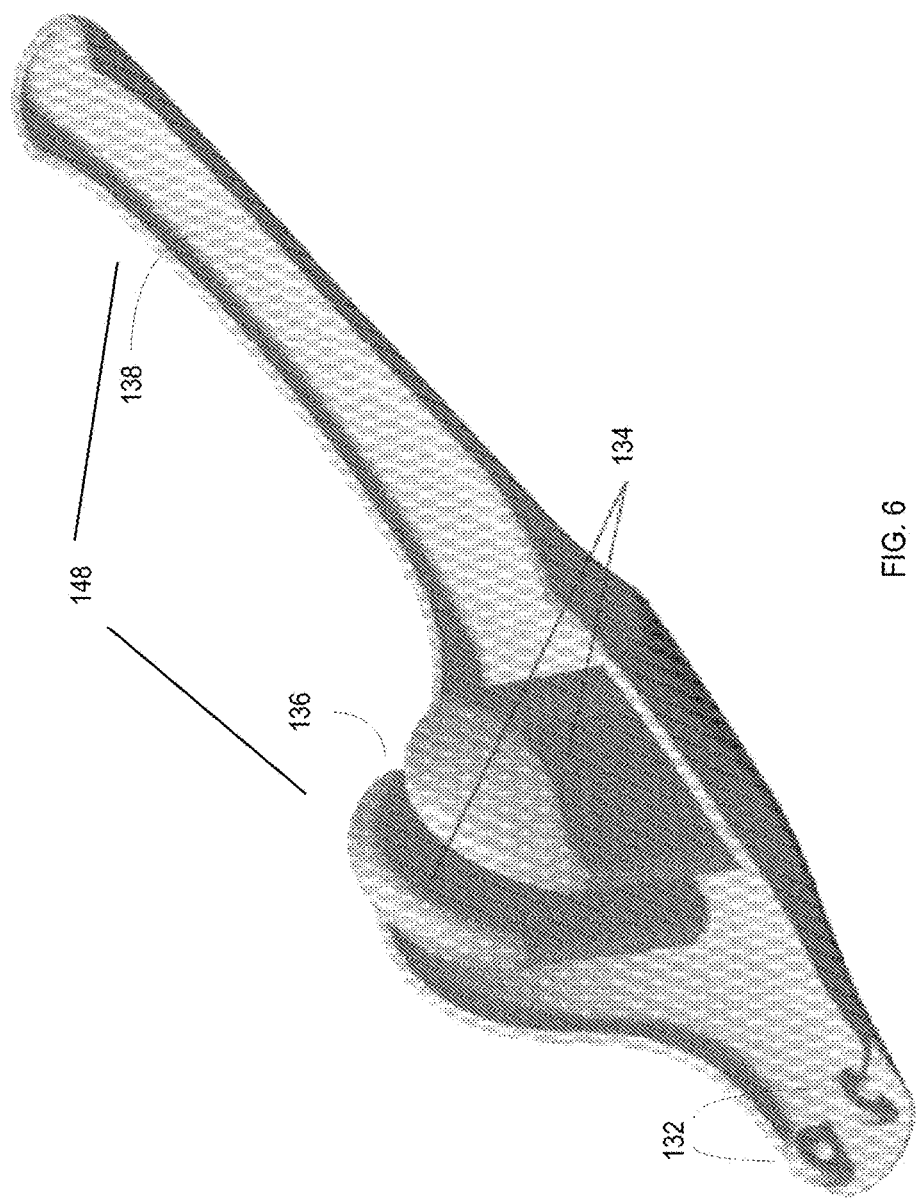
FIG. 6 is a bottom perspective view of the juicer portion of the fruit slicer and juicer of FIG. 5.
Figure 15:
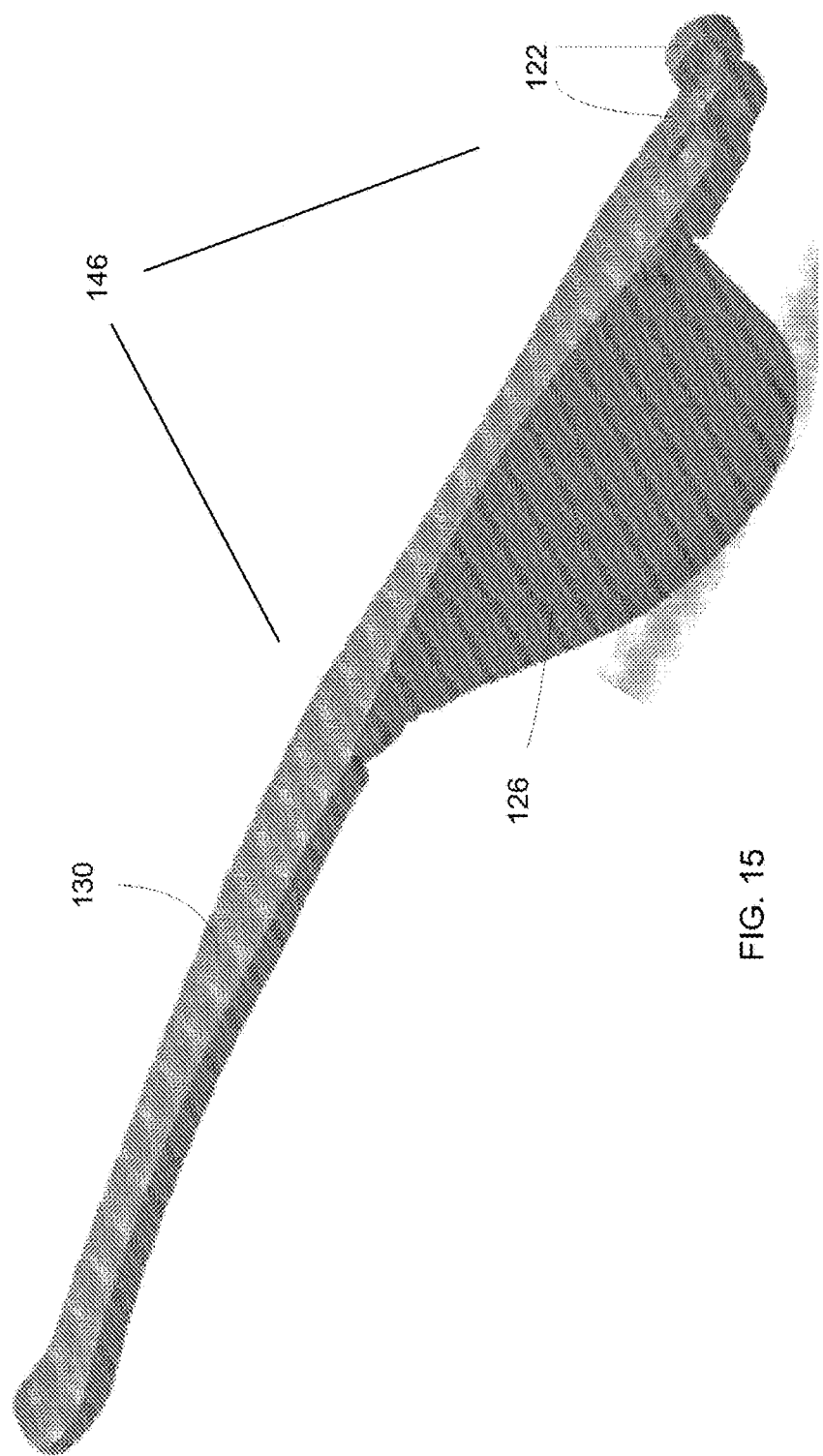
FIG. 15 is a top perspective view of the blade assembly of the fruit slicer and juicer of FIG. 5.

FIG. 5 is a top perspective view of a second embodiment of a fruit slicer and juicer 150 in a closed orientation. FIG. 6 is a bottom perspective view of the juicer portion of the fruit slicer and juicer of FIG. 5. FIG. 7 is an top front perspective view of the of the cradle portion of the fruit slicer and juicer of FIG. 5. FIGS. 8-12 are a front view, a top view, a side view, a bottom view, and a rear view, respectively, of the fruit slicer and juicer of FIG. 5. FIG. 13 is a side view of the fruit slicer and juicer of FIG. 5 in an open orientation. FIG. 14 is a side perspective view of the fruit slicer and juicer of FIG. 5 in an open orientation. FIG. 15 is a top perspective view of the blade assembly of the fruit slicer and juicer of FIG. 5.

In this example, the device includes a blade assembly 146, a juicer portion 148, and a cradle portion 144 all joined at their distal ends with a stop hinge 140. As illustrated in FIGS. 13 and 14, the device has an open position of approximately 120 degrees so that the blade and juicer handles can be conveniently grasped.

In one example, the blade assembly 146 includes a stainless steel blade 126 attached by blade attachment rivets 131 to a cast aluminum, aluminum-zinc, or polymer slicing handle 130.

The juicer portion 148 includes a juicing handle 138 with two spaced-apart juicer protrusions 134 providing a blade space 136 for the blade 126.

The cradle portion 144 includes a dome handle 120 with an integral fruit whole-dome 112 for holding a lemon, lime, or other fruit supported by fruit support ribs 185. Blade guides 180 are provided. Legs 190 are provided on the bottom of the device to prevent tipping.

The slicing handle 130 includes a pair of slicer hinge ring 122. The juicing handle 138 includes a pair of juicer hinge rings 132. The dome handle 120 includes a single dome hinge ring 110. A stop hinge is formed by providing a stop feature on the distal end of the juicing handle in order to limit the travel to 120 degrees. A clip 146 is provided through all hinge rings in order to serve as a pivot element and to hang the device for storage.

The operation of the device is similar to the operation of the first example described above.

The scope of the invention is not limited to the particular examples and embodiments described above.

What is claimed is:

1. A hand-held fruit juicer comprising
a blade assembly comprising
a hinged elongated blade handle having a proximal end and a distal end, and
a blade extending from the blade handle;
a juicer portion comprising
a juicer handle having a proximal end and a distal end, and
two spaced apart squeezer elements extending from the juicer handle;
a cradle portion having a proximal end and a distal end, the cradle portion comprising
a cradle handle having a proximal end and a distal end, and
a dome receptacle formed in the cradle handle, the dome receptacle comprising
a strainer, and
a plurality of fruit support ribs; and wherein the blade handle, the juicer handle and the cradle handle are all co-extensive and
a hinge element connecting the distal ends of the blade handle, juicer handle, and cradle handle,
such that
a portion of the blade handle between the blade and the proximal end of the blade handle is configured to be operable by hand,
a portion of the cradle handle between the dome receptacle and the proximal end of the cradle handle is configured to be operable by hand,
a portion of the juicer handle between the squeezer elements and the proximal end of the juicer handle is configured to be operable by hand,
the blade is rotatable from a first position substantially nested between the spaced apart squeezer elements, and a second position substantially within the dome receptacle, and
the squeezer elements are rotatable from a first position withdrawn from the dome receptacle, and a second position substantially within the dome receptacle.

2. The fruit juicer of claim 1 wherein the dome receptacle further comprises a juice funnel.

3. The fruit juicer of claim 1 wherein
the distal ends of the blade handle, juicer handle, and cradle handle comprise hinge rings; and
the hinge element is a bolt.

4. The fruit juicer of claim 1 wherein
the distal ends of the blade handle, juicer handle, and cradle handle comprise hinge rings; and
the hinge element is a stop hinge.

5. The fruit juicer of claim 1 wherein the blade assembly further comprises
a cast aluminum handle; and
a stainless steel blade riveted to the cast aluminum handle.

* * * * *